United States Patent Office 3,164,629
Patented Jan. 5, 1965

3,164,629
3',5'-DIALKANOYLOXYPHENYL-2 AMINO-
ETHANOL-(1) SALTS
Gerhard Zölss and Rudolf Kilches, Linz, Otto Schmid, near Linz, and Karl Wismayr, Linz, Austria, assignors to Osterreichische Stickstoffwerke Aktiengesellschaft, Linz, Austria
No Drawing. Filed June 12, 1962, Ser. No. 201,750
Claims priority, application Austria, June 21, 1961, A 4,796/61
4 Claims. (Cl. 260—479)

This invention relates to salts of new phenyl ethanol amine derivatives of the general formula:

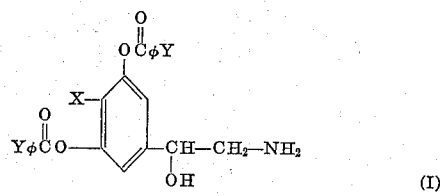

wherein Y is an alkyl group containing one to five carbon atoms and X is a hydrogen atom, an alkyl group containing one, two or three carbon atoms or

wherein Y is as defined above. The salts according to the invention are salts of compounds of the Formula I with non-toxic acids.

The said salts of compounds of Formula I have interesting physiological properties. They have a pronounced blood-pressure raising action of greatly prolonged duration in comparison with adrenalin and the non-acylated 3,5-dioxphenyl alkanol amines. Moreover, the salts of compounds of Formula I are distinguished by excellent peroral resorption. They are therefore particularly suitable for administration orally for the treatment of low blood presssure.

The following may be particularly mentioned as active compounds:

*d,l*-1-(3',5'-diacetoxyphenyl)-2-aminoethanol-1-hydrochloride
*d,l*-1-(3',5'-diacetoxyphenyl)-2-aminoethanol-(1)-acetate
*d,l*-1-(3',4',5'-triacetoxyphenyl)-2-aminoethanol-(1)-hydrochloride
*d,l*-1-(3',5'-dipropionyloxyphenyl)-2-aminoethanol-(1)-acetate
*d,l*-1-[3',5'-bis-(trimethylacetoxy)-phenyl]-2-aminoethanol-(1)-hydrochloride The invention also provides a process for the preparation of a salt of a phenyl ethanol amine derivative having the general formula:

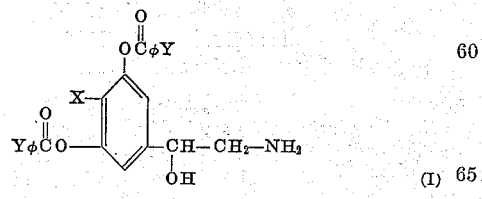

wherein Y and X are as defined above which comprises reducing with hydrogen an acylcyanide having the general formula:

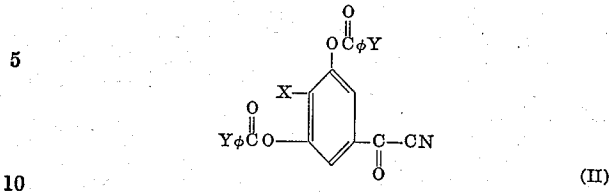

wherein Y and X are as defined above, in a week acid solution and in the presence of a noble metal catalyst.

Platinum oxide or palladium carbon will be particularly used as noble metal catalysts. The reaction is advantageously performed in a lower aliphatic carboxylic acid, preferably glacial acetic acid or propionic acid as solvent.

By the process according to the present invention it is possible to obtain the phenyl ethanol amine salts in a good yield in a single-stage reaction from the well-crystallised and easily purified acylcyanides of Formula II. The use of elevated temperatures or high pressure has proved unnecessary in the reduction according to the invention. The advantage of the process according to the invention is not only good accessibility of the starting material, but particularly that the use of ω-halo-acetophenone derivatives is avoided, since it is well known that these are very difficult to obtain and exert an intensive irritating effect on the mucous membranes of the eyes.

When the reduction is performed in a lower aliphatic carboxylic acid solvent, the phenyl ethanol amines of Formula I are most advantageously isolated as salts of these carboxylic acids. These salts can then be conventionally converted into the desired salts with other acids. Examples of such salts are not only the salt of lower carboxylic acids but also hydrohalides, nitrates, sulphates and hydrosulphates. If required, hydrogenation may be discontinued after utilising the quantity of hydrogen calculated for the production of the aminoketones, the latter may be isolated as salts and converted into the aminoalcohols in a further hydrogenation process.

The acylcyanides of Formula II required as starting material may be produced by conventional methods. It has been found particularly suitable to react the corresponding carboxylic acid chlorides with nondissociated metal cyanides, such as, for example, cuprouscyanide, at elevated temperature. The acylcyanides may be distilled in a fine vacuum without appreciable decomposition phenomena.

The following examples illustrate the invention; all parts are by weight.

*Example 1*

1.50 parts of platinum oxide are hydrogenated in glacial acetic acid, and then at 20° C. a solution of 10.0 parts of 3,5-diacetoxybenzoyl cyanide in 200 parts of glacial acetic acid is added slowly in drops during hydrogenation. After 3 mol of hydrogen have been absorbed, hydrogenation is stopped. The catalyst is separated and the clear and colourless filtrate is concentrated as far as possible in vacuo at a low temperature under a protective atmosphere of nitrogen. The residue is mixed and shaken with ether, 1-(3',5'-diacetoxy-phenyl)-2-aminoethanol-(1)- acetate rapidly crystallising out. After suction-filtration of the crystallisate, final washing with ether and drying, 9.70 parts are obtained, i.e. 76.5% of the theoretical. The crude substance can be purified by dissolving in methanol at room temperature and precipitating with ether. 7.70 parts of pure product are obtained of a micro-melting point of 109° to 115° C.

5.0 parts of d,l-1-(3',5'-diacetoxy-phenyl)-2-amino-ethanol-(1)-acetate are dissolved in glacial acetic acid, mixed with 2.0 parts of benzyl chloride and hydrogenated with palladium carbon as catalyst until completion of the hydrogen absorption. The catalyst is separated and the colourless filtrate is distilled off in vacuo at low temperature under a nitrogen atmosphere. The oily residue is taken up in methanol, mixed with ether until clouding, innoculated, cooled to −10° C. overnight, and the precipitated crystallisate is suction-filtered and finally washed with ether. 4.0 parts of d,l-1-(3',5'-diacetoxy-phenyl)-2-amino-ethanol-(1)-hydrochloride are obtained, i.e. 86.4% of the theoretical. Micromelting point: 125° to 130° C. The crude product can be purified from methanol/ether. The 3,5-diacetoxy-benzoyl cyanide required as starting material can be produced from 3,5-diacetoxy-benzoyl chloride and cuprous cyanide at 180° C. Melting point (from benzene): 115° to 118° C.

*Example 2* d,l-1-(3',5'-diacetoxy - phenyl)-2-amino-ethanol-(1)-acetate can also be produced in a modified version of Example 1, by adding the solution of 3,5-diacetoxy-benzoylcyanide in glacial acetic acid all at once and not gradually, after reduction of the platinum oxide. Under otherwise identical reaction conditions and with the same working up, 60.0% of the theoretically possible quantity of d,l-1-(3',5'-diacetoxy-phenyl)-2-amino - ethanol-(1)-acetate are obtained.

*Example 3*

0.70 part of platinum oxide are hydrogenated in glacial acetic acid and then at 20° C. a solution of 2.50 parts of 3,4,5-triacetoxy-benzoylcyanide in glacial acetic acid is slowly added in drops during hydrogenation and the hydrogenation is continued until the hydrogen absorption is complete.

The catalyst is separated, the filtrate is mixed with 1.03 parts of benzylchloride, 0.2 part of palladium carbon (10% palladium) are added, and hydrogenation continued until the hydrogen absorption is complete. The catalyst is filtered off and the filtrate is concentrated in vacuo at a low temperature under a nitrogen atmosphere. The oily residue crystallises slowly. The crystallisate is rubbed with a mixture of glacial acetic acid and ether 1:1 and suction-filtered, finally washed with ether and dried. The yield of d,l-1-(3',4',5'-triacetoxy-phenyl)-2-amino-ethanol-(1)-hydrochloride is 1.85 parts, i.e. 65.0% of the theoretical.

For purification purposes, the crude substance is dissolved in a small amount of glacial acetic acid, mixed with ether until clouding is permanent, cooled, and the precipitated crystallisate is suction-filtered after several hours. 1.6 parts of pure product are obtained with a micro-melting point of 82° to 87° C.

The production of the 3,4,5-triacetoxy-benzoylcyanide used as starting material is effected by reacting triacetyl gallic acid chloride with cuprouscyanide at 160° C. The 3,4,5-triacetoxybenzoyl-cyanide has a melting point (from benzene) of 124° to 125° C.

*Example 4*

0.70 part of platinum oxide are hydrogenated in glacial acetic acid, and then at 20° C. a solution of 10.25 parts of 3,5-diacetoxy-p-toluic acid cyanide in glacial acetic acid is slowly added in drops during hydrogenation, hydrogenation being continued until the hydrogen absorption is complete. The catalyst is then separated and the colourless filtrate is concentrated in vacuo at a low temperature. The oily residue is mixed with ether, shaken, and the resultant crystallisate is suction-filtered after some time. The yield of d,l-1-(3',5'-diacetoxy-4'-methyl-phenyl)-2-aminoethanol-(1)-acetate is 9.70 parts, i.e. 75.5% of the theoretical.

The hydrochloride was made from the acetate as in Example 1 by hydrogenation with benzylchloride. The yield of d,l-1-(3',5' - diacetoxy - 4'-methyl-phenyl)-2-amino-ethanol-(1)-hydrochloride is 8.0 parts, i.e. 89.0% of the theoretical, calculated with respect to the acetate used. The crude substance can be purified by re-precipitation from glacial acetic acid/ether and then has a micro-melting point of 154° to 161° C.

The 3,5-diacetoxy-p-toluic acid cyanide used as starting material was produced from 3,5-diacetoxy-4-methyl-benzoylchloride by reaction with cuprouscyanide at 190° C. It has a micro-melting point (from benzene) of 142° to 144° C.

*Example 5*

1.0 part of platinum oxide are hydrogenated in glacial acetic acid and then while hydrogenation continues a solution of 10.0 parts of 3,5-dipropionyloxy-benzoyl cyanide is slowly added in drops at room temperature. After absorption of 3 mol of hydrogen the reaction is complete. The catalyst is separated and the filtrate concentrated in vacuo at a low temperature. The residue crystallises after the addition of ether. The yield of d,l-1(3',5'-dipropinolyoxy - phenyl)-2-amino - ethanol-(1)-acetate is 8.0 parts, i.e. 64.5% of the theoretical. The substance can be purified by re-precipitation from glacial acetic acid/ether. Micro-melting point: 100° to 106° C.

The 3,5-dipropionyloxy-benzoyl-cyanide required as starting product is prepared by reacting 3,5-dipropionyloxy-benzoyl chloride with cuprous cyanide at elevated temperature. Micro-melting point 91° to 93° C.

*Example 6*

0.40 part of platinum oxide are hydrogenated in glacial acetic acid, hydrogenation is continued and at 20° C. a solution of 2.0 g. of 3,5-bis-(trimethylacetoxy)-benzoylcyanide is slowly added in drops. After absorption of 3 mol of hydrogen the reaction is complete. The catalyst is separated, the colourless filtrate is concentrated in vacuo and the final residues of solvent are removed by an oil pump. The resultant 2.0 g. of d,l-1-[3',5'-bis-(trimethylacetoxy) - phenyl]-2-amino - ethanol-(1)-acetate corresponds to a yield of 83.4% of the theoretical. Melting point: 208° to 210° C.

The starting product was prepared by the reaction of 3,5-bis-(trimethyl-acetoxy)-benzoylchloride with cuprous cyanide at elevated temperature. Micro-melting point: 125° to 126° C.

We claim:

1. A salt of a non-toxic acid and a diacylated phenyl ethanol amine of the formula

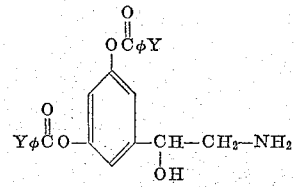

wherein Y is an alkyl group of from one to five carbon atoms.

2. d,l-1-(3',5'-diacetoxyphenyl) - 2-aminoethanol-(1)-hydrochloride.

3. d,l-1-(3',5'-diacetoxyphenyl)-2 - aminoethanol-(1)-acetate.

4. d,l-1-(3',5'-dipropionyloxyphenyl)-2-aminoethanol-(1)-acetate.

References Cited in the file of this patent

FOREIGN PATENTS 789,033  Great Britain _____ Jan. 15, 1958

OTHER REFERENCES

Corrigan et al.: Journal of the American Chemical Society, vol. 71, pages 530–531 (1949).

Dornow et al.: Chemische Berichte, vol. 88, pages 1267–1275 (1955).